(12) United States Patent
Quach

(10) Patent No.: US 6,748,619 B2
(45) Date of Patent: Jun. 15, 2004

(54) HAND HELD, ELECTRIC CLEANING DEVICE

(76) Inventor: Trung Thieu Quach, 520 - 15th Ave. East, Seattle, WA (US) 98112

( * ) Notice: Subject to any disclaimer, the term of this patent is extended or adjusted under 35 U.S.C. 154(b) by 226 days.

(21) Appl. No.: 10/104,521

(22) Filed: Mar. 22, 2002

(65) Prior Publication Data
US 2003/0177595 A1 Sep. 25, 2003

(51) Int. Cl.$^7$ .............................................. A46B 13/04
(52) U.S. Cl. .......................................... 15/29; 15/97.3
(58) Field of Search ........................... 75/24, 29, 97.1, 75/97.3

(56) References Cited

U.S. PATENT DOCUMENTS

| | | | |
|---|---|---|---|
| 3,688,139 A | * | 8/1972 | Yaguchi ...................... 310/50 |
| 4,202,068 A | | 5/1980 | Lester et al. |
| 4,237,570 A | | 12/1980 | Brock, Jr. |
| 4,335,481 A | | 6/1982 | Slayman |
| 4,780,992 A | | 11/1988 | McKervey |
| 5,289,605 A | | 3/1994 | Armbruster |
| 5,511,269 A | | 4/1996 | Watson |
| 6,170,108 B1 | * | 1/2001 | Knight ........................... 15/29 |
| 2002/0129835 A1 | * | 9/2002 | Pieroni et al. .................. 134/6 |

* cited by examiner

Primary Examiner—Randall Chin
(74) Attorney, Agent, or Firm—Dean A. Craine

(57) ABSTRACT

A hand-held, electric-powered cleaning device used to wash elevated or difficult-to-reach surfaces. The device includes a length adjustable elongated pole with a rotating brush assembly attached at its distal end. Attached to the proximal end of the elongated pole is a handle assembly that includes a battery housing and a hand grip assembly with a brush control switch and a hose connector fitting. Disposed inside the elongated pole is a coiled water conduit that connects to a standard hose fitting located in the end of the handle assembly and terminates in the brush assembly to deliver water to the brush assembly. Also disposed inside the handle assembly is a soap delivery system to deliver soap to the water conduit.

19 Claims, 5 Drawing Sheets

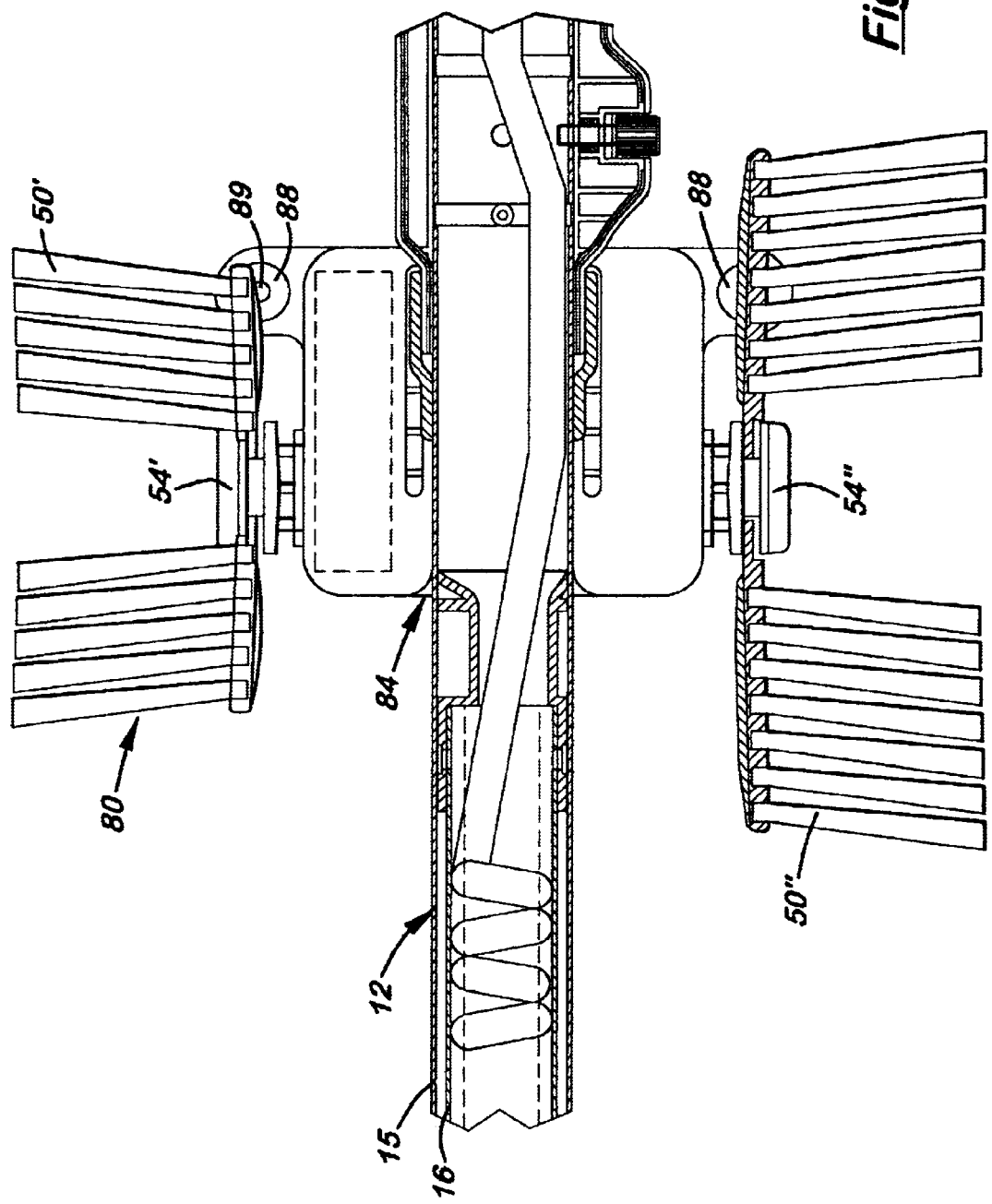

HAND HELD, ELECTRIC CLEANING DEVICE

BACKGROUND OF THE INVENTION

1. Field of the Invention

This invention relates to hand-held cleaning devices, and more particularly, to such devices that use an electric-powered brush.

2. Description of the Related Art

Soap and water are commonly used to wash motor vehicles. Often the brushes used to clean a surface of the motor vehicle are attached to a short or long pole. When washing a motor vehicle with a brush attached to a long pole, the pole and brush must be sufficiently lightweight and balanced so that the brush may be moved back and forth over the surface to remove dirt and grime. The brush must remain in constant contact with the surface. Unfortunately, when moving the brush in this manner and when the desired surface is difficult to reach, the brush may turn thereby reducing its cleaning action and possibly scratching the surface.

What is needed is a lightweight, electric-powered cleaning device that uses a length adjustable, elongated pole with a rotating brush attached at one end that reduces the need for the device to be moved manually back and forth across the surface, and that can be easily extended with one or two hands to reach hard-to-reach surfaces. What is also needed is a cleaning device which runs on D.C. current produced by rechargeable batteries. What is also needed is such a cleaning device that easily connects to a standard hose and includes a soap delivery system so that soap may be selectively added to the water and dispensed from the rotary brush. What is also needed is such a cleaning device that can be easily stored in a wall mount where the rechargeable batteries can be recharged.

SUMMARY OF THE INVENTION

It is an object of the present invention to provide a lightweight, balanced, hand-held cleaning device that is used to clean surfaces on a motor vehicle.

It is another object of the present invention to provide such a device that includes a length adjustable elongated pole with an adjustable brush assembly attached at one end and a fixed handle assembly attached to the opposite end of the elongated pole.

It is a further object of the invention to provide such a device that includes a battery-operated motor, a water delivery conduit that attaches to a standard hose, and a soap delivery system.

It is a further object of the invention to provide such a cleaning device that can be easily attached to a wall mount used for storage of the device.

These and other objects of the invention which will become apparent are met by the hand-held, battery-operated cleaning device disclosed herein. The device includes a length adjustable elongated pole with an adjustable brush assembly pivotally attached at its distal end. The brush assembly includes an upper shroud with fixed bristles located on its outer edge used to clean the surface and prevent overspraying. The brush assembly houses an electric motor and a replaceable brush that is balanced in weight with a handle assembly attached at the opposite, proximal end of the elongated pole. Disposed inside the elongated pole is a coiled water conduit that delivers water from a standard hose fixing located in the handle assembly to the brush assembly. Disposed around the elongated pole is a sliding hand grip which allows the elongated pole to be rotated by one hand and supported by the other. The coil water conduit is coiled up inside the elongated pole and is able to accommodate different lengths of the elongated pole. The handle assembly includes a battery housing with a rechargeable battery and a hand grip housing with an electric motor control switch. Located above the handle assembly is an optional soap delivery system which is connected to the water conduit to automatically and selectively add soap to the water as it flows through the water conduit and is delivered to the brush assembly. Provided with the cleaning device is a battery charger that plugs into a standard 115 volt electrical receptacle. An ancillary power cord is also provided that connects at one end to the battery charger and at an opposite end to the plug receptacle formed on the end of the rechargeable button. Also included is an optional wall mount that conveniently holds the device on a wall. The wall mount includes at least one replacement brush receiver for holding replacement brushes to be used with the device.

BRIEF DESCRIPTION OF THE DRAWINGS

FIG. 5 is a sectional side elevational view of the handle assembly.

DESCRIPTION OF THE PREFERRED EMBODIMENT(S)

Figure 1:
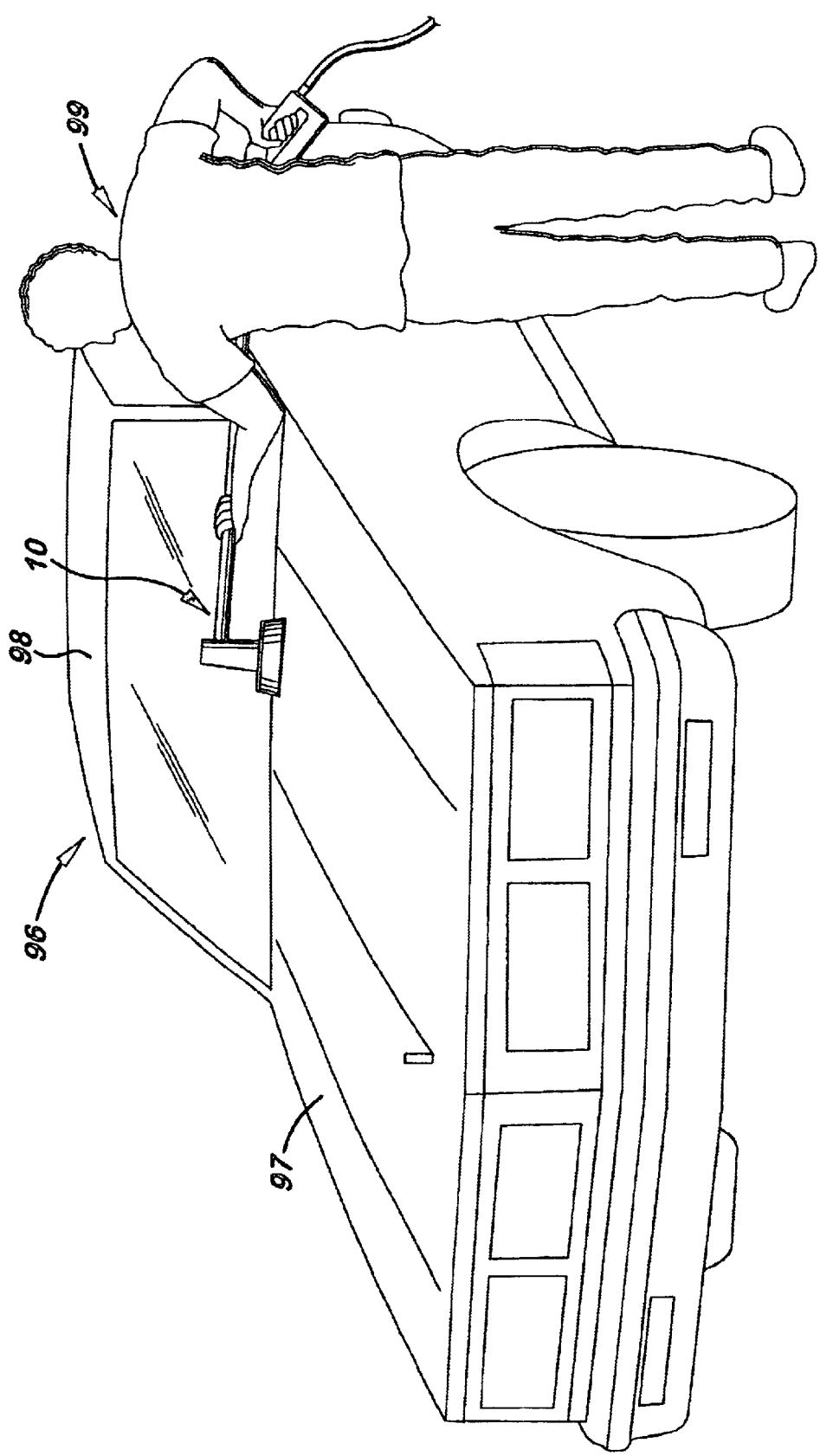
FIG. 1 is a perspective of a user using the electric-powered cleaning device to clean a motor vehicle.
Figure 2:
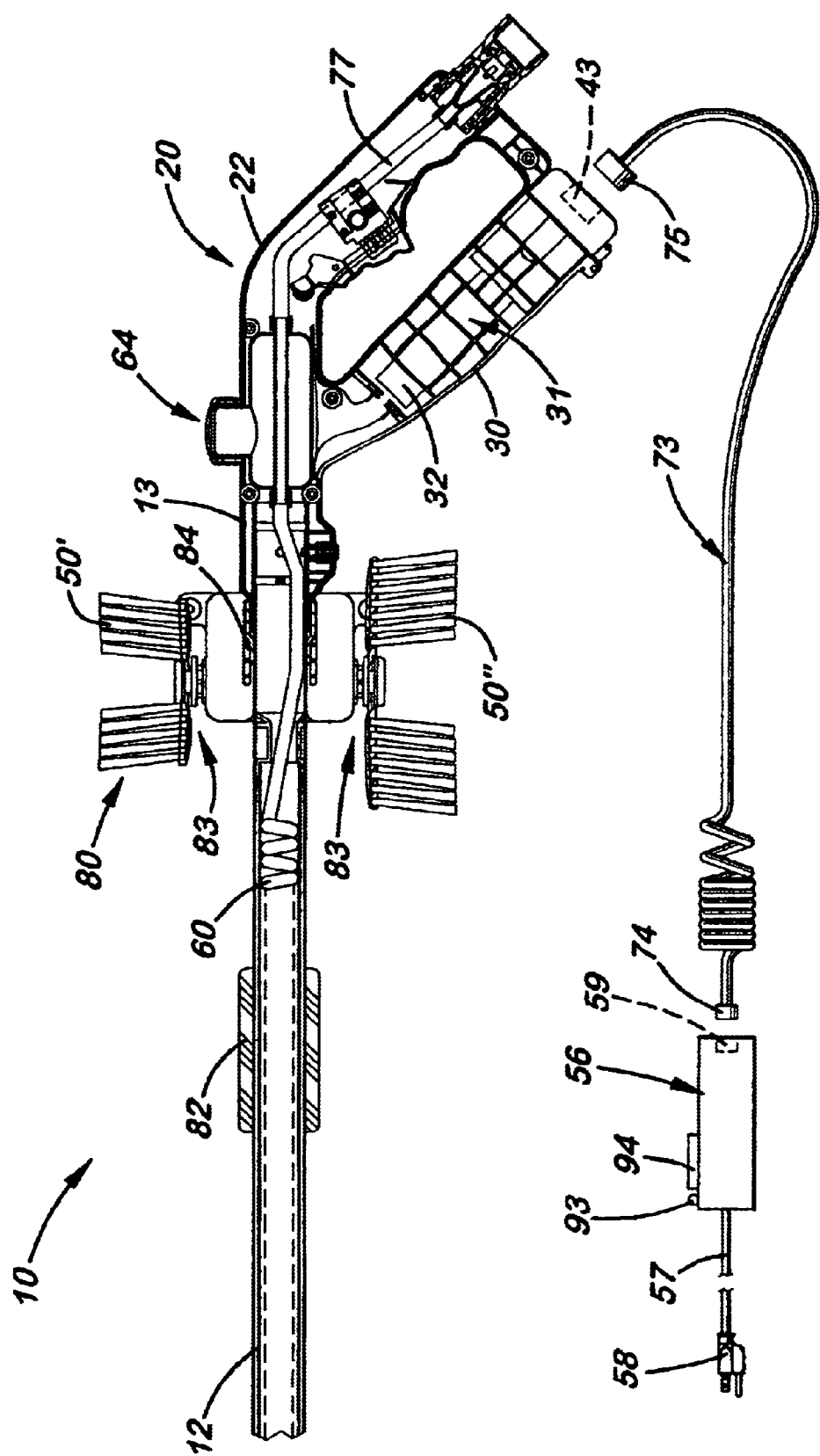
FIG. 2 is a sectional, side elevational view of the cleaning device.

In the accompanying FIG. 1, wherein like reference numbers denote like components, there is shown a hand-held, electric-powered cleaning device 10 used to wash elevated or difficult-to-reach surfaces, such as the top of the hood 95 or roof 96 on a motor vehicle 96. The cleaning device 10 is designed to allow a user 99 to effectively wash different surfaces on a large object, such as a motor vehicle 96, truck or aircraft, with ease and without damaging the surfaces.

As shown more clearly in FIGS. 2–5, the cleaning device 10 includes a length adjustable, elongated pole 12 with a fixed handle assembly 20 attached at its proximal end 13. Attached to the distal end 14 of the elongated pole 12 opposite the fixed handle assembly 20 is an adjustable, motorized brush assembly 40. The cleaning device 10 also includes water and soap delivery systems and switch control means to control the motorized brush assembly 40.

Figure 3:
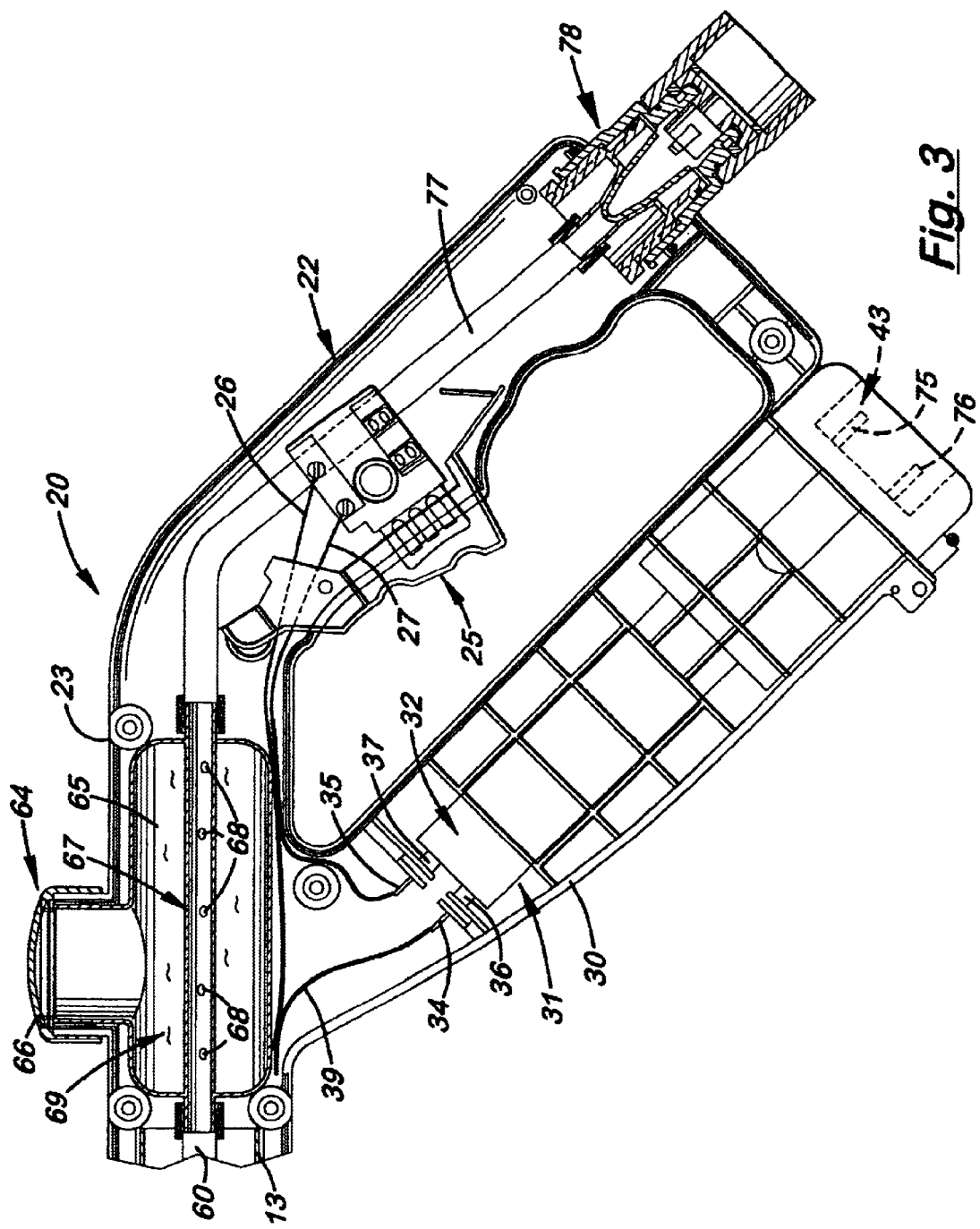
FIG. 3 is a section side elevational view of the adjustable brush assembly.

As shown more clearly in FIG. 3, the fixed handle assembly 20 comprises a hand grip housing 22 and a battery housing 30. The hand grip housing 22 is hollow and diagonally aligned with an upper section 23 longitudinally aligned and attached to the proximal end 13 of the elongated pole 12. Extending from the lower surface of the hand grip housing 22 is a trigger switch 25 that electrically connects via wires 26, 27 to a 12-Volt D.C. rechargeable battery pack 32 disposed inside the battery housing 30 and to the electric motor 48 located in the brush assembly 40 (see FIG. 4). The battery housing 30 is located in front and parallel to the hand grip housing 22. The battery housing 30 is hollow and includes a longitudinally aligned cavity 31 designed to hold the cylindrical-shaped rechargeable battery pack 32. Located in the upper, closed end of the cavity 31 are suitable contact connectors 34, 35 that connect to the switch 25 and electric motor 48 via wires 26, 27, respectively. A second wire 39 is connected to contact connector 34 that connects at its opposite end to the electric motor 48.

The battery pack 32 is an elongated cylinder complementary in shape to fit into the cavity 31 formed in the battery housing 30. The battery pack 32 has two terminals 36, 37 located at its upper end that connect to two connectors 34, 35 located inside the battery housing 30. Formed on the lower end of the battery pack 32 is a plug receiver 45 with two electrical prongs 46, 47 longitudinally aligned therein. To recharge the battery pack 32, a charger 56 is provided that includes a power cord 57 and male connector 58 that plugs into a standard 115-volt AC electrical outlet (not shown). An auxiliary power cord 73 is also provided that includes a first female plug connector 74 that plugs into the power receptacle 59 on the charger 56. Attached to the opposite end of the auxiliary power cord 73 is a second female connector 75 that connects to the plug receiver 45 to supply a recharging circuit to the battery pack 32.

Figure 4:
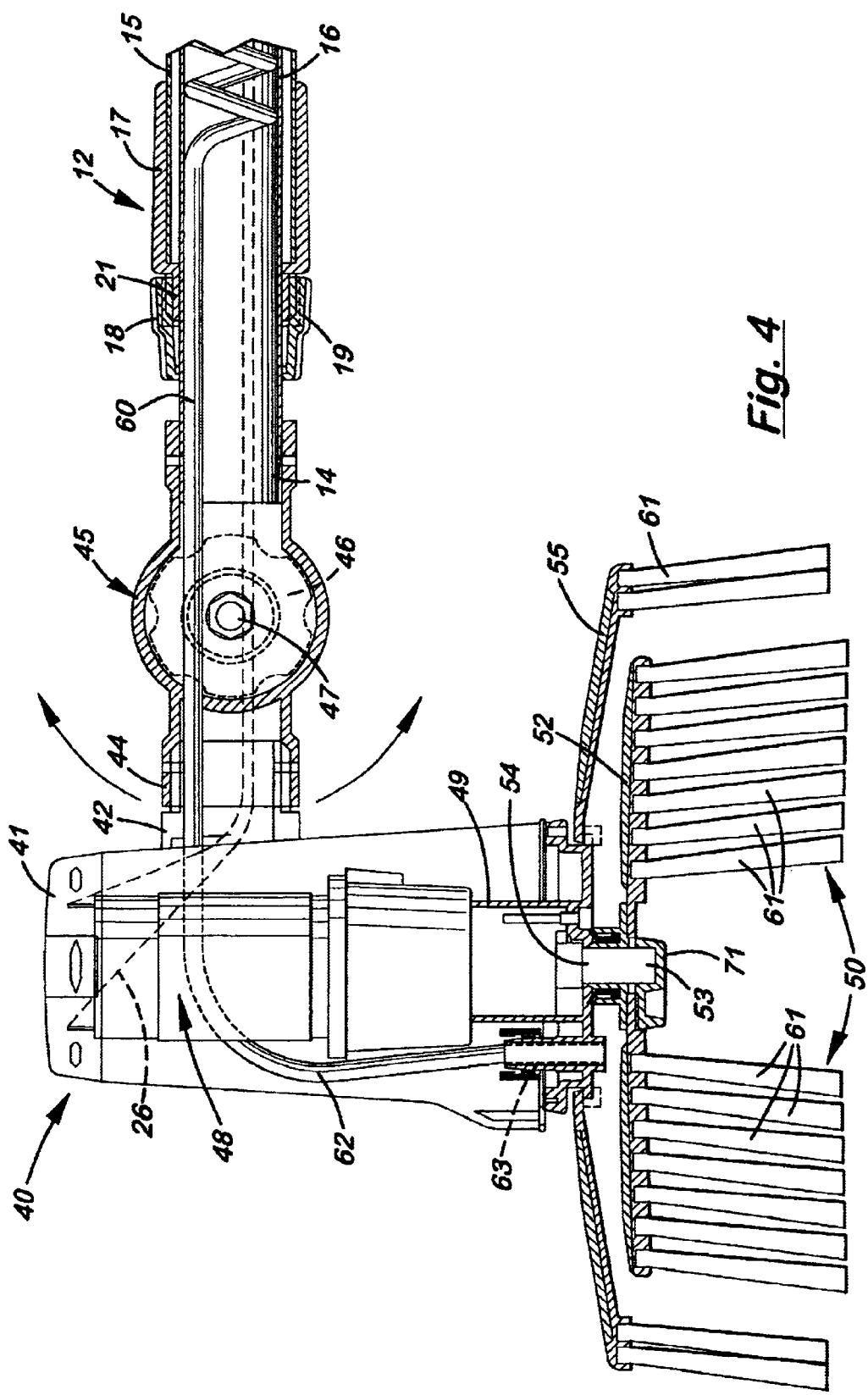
FIG. 4 is a sectional side elevational view of the accessory brush mount.

As shown more clearly in FIG. 4, the brush assembly 40 includes a brush housing 41 that houses a 12-Volt D.C. electric motor 48. Attached to the drive shaft 35 of the electric motor 48 is a circular brush 50 that rotates to clean a surface. Attached to the lower edge of the brush housing 41 is a fixed, circular shroud 55 that extends outward and around the brush 50. Extending downward from the perimeter edge of the shroud 55 is a plurality of bristles 56 that are used to clean a surface but also prevent overspray from the brush 50 as it rotates inside the shroud 55. The brush housing 41 is cylindrical-shaped with a laterally extended short neck section 42 formed on its rear surface. The electric motor 48 is longitudinally aligned inside the brush housing 41 with its drive shaft 49 extending downward through its lower opening. During assembly, the neck section 42 selectively attaches to a receiver 44 formed on a coupler assembly 45 attached to the distal end 14 of the elongated tube 12. The coupler assembly 45 includes a turn nut 46 attached to a transversely aligned bolt 47 that securely attaches the coupler assembly 45 to the neck section 42 and to the distal end 19 of an inner tube 16 that slides into a cylindrical-shaped receiver 48 formed on the end of the coupler assembly 48 opposite the brush assembly housing 41.

As mentioned above, the brush 50 is circular and designed to fit inside the circular shroud 55. In the preferred embodiment, the brush 50 includes a plurality of bristles 51 attached to a circular disk 52. Attached to the distal end of the drive shaft 49 and extended through a center hole 53 formed in the circular disk 52 is a hub 54. Attached to the hub 54 is a fixed cam nut 57 to which the center hole 53 fits over and engages to selectively attach the disk 52 to the hub 54.

As mentioned above, the elongated handle 12 is telescopic thereby enabling the user to selectively adjust its length. In the preferred embodiment, the elongated handle 12 includes a coaxially aligned outer tube 15 and an inner tube 16. As shown in FIG. 4, attached to distal end of the outer tube 15 is a fixed coupler 17. The fixed coupler 17 includes a threaded neck 18 to which a threaded nut 19 is attached. During operation, the nut 19 is selectively loosened on the neck 18 so the inner tube 16 may be longitudinally adjusted inside the outer tube 15. The nut 19 also allows the inner tube 16 to rotate inside the outer tube 15 thereby enabling the user to adjust the axial orientation of the brush assembly 40. Disposed over the end of the sleeve 17 is a tightening nut 18 that maybe tightened to squeeze the distal end of the outer tube 15 against the distal end of the inner tube 16 to lock the inner tube 16 in position within the outer tube 15.

Disposed inside the elongated pole 12 is a water conduit 60. The distal end of the water conduit 60 extends through the coupler assembly 45 and attaches to the end of a short water conduit 62 located inside the brush assembly housing 41. The end of the short water conduit 62 terminates at a port opening 63 located above the brush 50. The water conduit 60 is coiled inside the elongated pole 12 and can be adjusted in length for different lengths of the elongated pole 12.

As shown more clearly in FIG. 3, located above the handle assembly 20 is a soap delivery system 64 including a soap reservoir tank 65 with a removable cap 66. The reservoir tank 65 includes a center conduit 67 that extends longitudinally across the reservoir tank 65. The distal end of the center conduit 67 is attached to the water conduit 60. The opposite proximal end of the center conduit 67 is attached to a short delivery conduit 77 that extends longitudinally inside the handle grip 22. The end of the delivery conduit 77 attaches to a hose fitting 78. The center conduit 67 includes a plurality of holes 68 formed along its length that allows soap 69 via capillary action to mix with the water as it passes through the center conduit 67. In the preferred embodiment, there are five, evenly spaced apart holes 68 approximately 1/32 inch in diameter and the soap reservoir tank 65 holds approximately 3 to 4 ounces of liquid soap.

During use, the fixed handle assembly 20 is held by one hand, with the fingers being used to activate the switch 25 that controls the electric motor 48. The user uses the opposite hand to hold an optional handle grip 82 located over the middle section of the elongated pole 12 that rotates 180 degrees and slides longitudinally over the elongated pole 12 so that the brush 50 may be held at the proper orientation and extended over the desired surface above, below or lateral to the user.

The cleaning device 10 includes an optional wall mount 80 used to hold the device 10 on a wall surface. The wall mount 80, shown more clearly in FIG. 5, includes at least one brush receiver 83 used to accept a hub 53 on the replacement brushes 50', 50". The wall mount 80 also includes a horizontally aligned pole receiver slot 84 that slidingly receives the elongated pole 12. In the preferred embodiment, holes 88 are also formed on the mount 80 which are used to attach the wall mount 80 to a vertical surface via bolts 89. The elongated pole 12 is then attached to the pole receiving slot 84.

As mentioned above, the device includes a battery recharger 56 used to recharge the battery 32 located inside the battery housing 30. In the preferred embodiment, the recharger 56 includes a power cord 57 that plugs into a standard 115-Volt electrical plug-in and an auxiliary power cord 73 that plugs into a plug receiver space 45 built into the end of the battery 32. Standard LED lights 93 and an "on/off" switch 94 may be included on the sides of the recharger 56 enabling the user to monitor the recharging process.

In the preferred embodiment, the outer tube 16 is made of aluminum, and measures approximately 28 to 42 inches in length and 1½ inches in diameter. The inner tube 17 is made of aluminum and measures approximately 1 inch in diameter and 28 to 42 inches in length. The water conduit 60 is approximately 48 to 60 inches in length. The electric motor 48 operates at 12 Volts D.C. current and at 3,000 RPM with the gears being at a ratio of 10:1 so that the brush rotates at approximately 300 RPM. The brush 50 is approximately 3 inches in length and 8 inches in diameter. The fixed handle assembly 20, the accessory brush mount 80, the brush housing 41, and the shroud 55 are all made of plastic. The overall weight of the device 10 is approximately 6 lbs.

During use, soap is added to the soap reservoir tank 65 and the end of a hose is attached to the hose fitting 78 and the water is turned "on" so that water is delivered from the brush assembly 40. The user then adjusts the length of the elongated pole, the axial orientation of the brush assembly, and the pitch angle of the brush assembly. The user then positions the brush 50 over the desired location of the motor vehicle 96 and activates the electric motor 48 by pressing switch 25 inward. As water is delivered to the brush assembly 40, soap stored in the soap reservoir tank 65 is automatically dispersed therein.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A hand-held cleaning device, comprising:
   a. A telescopic elongated pole, said elongated pole having a distal end and a proximal end;
   b. a brush assembly attached to said distal end of said elongated pole, said brush assembly including an electric motor, a circular shroud with outer fixed bristles and a rotating brush located inside said shroud and connected to said electric motor;
   c. a handle assembly attached to said proximal end of said elongated pole, said handle assembly including a hand grip housing and a battery housing;
   d. a water conduit disposed inside said elongated pole and said handle assembly to deliver water to said brush assembly;
   e. a soap delivery system that automatically delivers soap to said water conduit as water flows through said water conduit;
   f. a rechargeable battery located inside said battery housing and electrically connected to said electric motor;
   g. a switch located inside said hand grip housing and connected between said rechargeable battery and said electric motor;
   h. means for recharging said rechargeable battery; and,
   i. means for connecting a hose to said central conduit for delivering water to said central conduit.

2. The cleaning device as recited in claim 1, further including a mount for temporarily storing said device on a wall.

3. The cleaning device as recited in claim 2, wherein said means to recharge said rechargeable battery is a recharging unit located inside said mount.

4. The cleaning device as recited in claim 2, further including a brush receiver attached to said mount to hold a replacement brush.

5. The cleaning device, as recited in claim 1, further including a hand grip attached to said elongated pole enabling said distal end of said elongated pole to be selectively rotated while supported.

6. The cleaning device, as recited in claim 5, wherein said elongated pole includes a longitudinally aligned inner tube and outer tube that move telescopingly to adjust the length of said elongated pole.

7. The cleaning device, as recited in claim 1, further including a coupler disposed between said elongated pole and said brush assembly to selectively connect said brush assembly to said elongated pole.

8. The cleaning device as recited in claim 1, wherein said water conduit is coiled inside said elongated pole.

9. The cleaning device as recited in claim 1, wherein said brush assembly and said handle assembly are approximately equal in weight.

10. The cleaning device as recited in claim 1, wherein said battery housing is located in front of said hand grip housing.

11. The cleaning device, as recited in claim 1, wherein said means for connecting a hose to said central conduit is a delivery conduit that extends through said handle assembly.

12. A hand-held cleaning device, comprising:
    a. an elongated pole that is adjustable in length and having a distal end and a proximal end and including a longitudinally aligned inner tube and outer tube capable of being telescopically adjusted in length;
    b. a brush assembly attached to said distal end of said elongated pole, said brush assembly including an electric motor and a rotating brush connected to said electric motor;
    c. a handle assembly attached to said proximal end of said elongated pole, said handle assembly including a hand grip housing and a battery housing;
    d. a water conduit disposed inside said elongated pole, said water conduit terminating at one end in said brush assembly and at an opposite end at said handle assembly;
    e. a soap delivery system including a reservoir for holding soap and a central conduit that connects to said water conduit, said central conduit including a plurality of holes formed therein to enable soap to enter said central conduit via capillary action when water flows through said central conduit;
    f. a rechargeable battery located inside said battery housing and electrically connected to said electric motor;
    g. a switch located inside said hand grip housing and connected between said rechargeable battery and said electric motor;
    h. means to recharge said rechargeable battery; and,
    i. a mount for temporarily storing said device on a wall.

13. The cleaning device as recited in claim 12, further including a shroud attached to said brush assembly and extending over said brush, said shroud including means to prevent water from said brush from spraying outward during operation.

14. The cleaning device as recited in claim 12, further including a brush receiver attached to said mount to hold a replacement brush.

15. The cleaning device as recited in claim 12, further including a coupler disposed between said elongated pole and said brush assembly and used to selectively attach said brush assembly to said elongated pole.

16. The cleaning device as recited in claim 12, wherein said brush assembly and said handle assembly are approximately equal in weight.

17. The cleaning device as recited in claim 12, wherein said battery housing is located in front of said hand grip housing.

18. The cleaning device, as recited in claim 12, wherein said means for connecting a hose to said central conduit is a delivery conduit that extends through said hand grip housing.

19. The cleaning device, as recited in claim 12, further including a handle grip rotatably mounted on said elongated pole enabling the elongated pole to be supported with one hand while rotated with the opposite hand.

* * * * *

UNITED STATES PATENT AND TRADEMARK OFFICE
CERTIFICATE OF CORRECTION

PATENT NO. : 6,748,619 B2
DATED : June 15, 2004
INVENTOR(S) : Trung Thieu Quach

It is certified that error appears in the above-identified patent and that said Letters Patent is hereby corrected as shown below:

Column 5,
Line 32, after "conduit", please insert -- said soap delivery system including a reservoir for holding soap and a central conduit extending therethrough, said central conduit connected at one end to said water conduit and including a plurality of holes formed therein to enable soap from said reservoir to enter said central conduit via capillary action when water flows therethrough; --

Signed and Sealed this

Thirtieth Day of November, 2004

JON W. DUDAS
*Director of the United States Patent and Trademark Office*